(12) United States Patent
Kikuchi

(10) Patent No.: US 8,146,692 B2
(45) Date of Patent: Apr. 3, 2012

(54) HYBRID VEHICLE, AND HYBRID-VEHICLE CONTROL METHOD

(75) Inventor: Yoshiaki Kikuchi, Toyota (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 1 day.

(21) Appl. No.: 12/933,742

(22) PCT Filed: Feb. 11, 2009

(86) PCT No.: PCT/IB2009/000231
§ 371 (c)(1),
(2), (4) Date: Sep. 21, 2010

(87) PCT Pub. No.: WO2009/115875
PCT Pub. Date: Sep. 24, 2009

(65) Prior Publication Data
US 2011/0024211 A1     Feb. 3, 2011

(30) Foreign Application Priority Data
Mar. 21, 2008 (JP) .................................. 2008-074130

(51) Int. Cl.
*B60W 20/00*     (2006.01)
(52) U.S. Cl. ................. 180/65.29; 180/65.31; 180/65.25
(58) Field of Classification Search ............... 180/65.21, 180/65.1, 65.245, 65.25–65.29, 65.31, 65.275–65.285; 701/22
See application file for complete search history.

(56) References Cited

U.S. PATENT DOCUMENTS

| 6,166,449 | A  | * | 12/2000 | Takaoka et al. | ............. | 290/40 B |
| 6,285,163 | B1 | * | 9/2001  | Watanabe et al. | ............. | 320/132 |
| 6,600,293 | B2 | * | 7/2003  | Kikuchi | ......................... | 320/131 |
| 6,856,866 | B2 | * | 2/2005  | Nakao | .............................. | 701/22 |
| 7,641,009 | B2 | * | 1/2010  | Akimoto | .................... | 180/65.21 |
| 7,828,094 | B2 | * | 11/2010 | Ochiai et al. | ............... | 180/65.28 |

(Continued)

FOREIGN PATENT DOCUMENTS

EP     2 060 433 A1     5/2009

(Continued)

OTHER PUBLICATIONS

Japanese Office Action for corresponding Japanese Patent Application No. 2008-074130 drafted Oct. 23, 2009, 5 pages.

(Continued)

*Primary Examiner* — J. Allen Shriver, II
*Assistant Examiner* — James Triggs
(74) *Attorney, Agent, or Firm* — Sughrue Mion, PLLC

(57) ABSTRACT

The correction coefficient α is set such that, when the atmospheric pressure Pa is lower than the threshold pressure Paref, the maximum dischargeable electric power of the battery is made smaller than it is when the atmospheric pressure Pa is equal to or higher than the threshold pressure Paref (S120, S220). Then, the maximum dischargeable electric power Wout of the battery is calculated by multiplying the basic maximum dischargeable electric power Woutb by the correction coefficient α (S140), and the engine and the two motors are controlled such that the required vehicle torque Tr* is produced to propel the hybrid vehicle without discharging electric power from the battery beyond the maximum dischargeable electric power Wout (S150-S210). As such, an excessive decrease in the charge level SOC of the battery can be prevented even when the hybrid vehicle is running in an area where the atmospheric pressure is low, such as high-altitude areas.

6 Claims, 6 Drawing Sheets

U.S. PATENT DOCUMENTS

| | | | |
|---|---|---|---|
| 7,969,120 B2* | 6/2011 | Plett | 320/145 |
| 8,022,674 B2* | 9/2011 | Miura | 320/132 |
| 2007/0255477 A1* | 11/2007 | Okuda et al. | 701/93 |
| 2009/0005923 A1* | 1/2009 | Shimizu et al. | 701/22 |
| 2009/0127011 A1* | 5/2009 | Zhang | 180/65.28 |
| 2009/0321163 A1* | 12/2009 | Suzui | 180/65.265 |

FOREIGN PATENT DOCUMENTS

| | | |
|---|---|---|
| JP | 08-322107 A | 12/1996 |
| JP | 2003-047110 A | 2/2003 |
| JP | 2003-199211 A | 7/2003 |
| JP | 2005-180255 A | 7/2005 |
| JP | 2007-185074 A | 7/2007 |
| WO | 2007/094278 A1 | 8/2007 |
| WO | 2008/029489 A1 | 3/2008 |
| WO | 2008/099693 A1 | 8/2008 |

OTHER PUBLICATIONS

International Search Report, 5 pages and Written Opinion of the International Searching Authority for corresponding International Patent Application No. PCT/IB2009/000231 mailed Jun. 23, 2009, 5 pages.

Written Opinion of the International Preliminary Examining Authority for corresponding International Patent Application No. PCT/IB2009/000231 mailed Feb. 23, 2010, 5 pages.

* cited by examiner

HYBRID VEHICLE, AND HYBRID-VEHICLE CONTROL METHOD

BACKGROUND OF THE INVENTION

1. Field of the Invention

The invention relates to a hybrid vehicle and a hybrid-vehicle control method.

2. Description of the Related Art

Japanese Patent Application Publication No. 2005-180255 (JP-A-2005-180255) described a hybrid vehicle having an engine, a motor-generator that generates electric power using the drive force of the engine and produces drive force to assist the engine, and a power storage device that powers and is powered by the motor generator. According to this publication, when the hybrid vehicle is running in an area where the density of air drawn into the engine is low, such as a high-altitude area, the target charge level of the power storage device is increased to prevent the charge level of the power storage device from becoming too low to compensate for a decrease in the engine output.

As such, in a hybrid vehicle, it is important to properly manage the charge level of the battery. In the case of a hybrid vehicle that runs by converting the drive force of an engine into torque via two electric motors and a planetary gear mechanism, when the hybrid vehicle is running in an area where the atmospheric pressure is low, such as a high-altitude area, the output of the engine decreases due to the low air density, and therefore the power discharge from the battery increases, resulting in an excessive decrease in the charge level of the battery.

SUMMARY OF THE INVENTION

The invention provides a hybrid vehicle and a hybrid-vehicle control method that prevent an excessive decrease in the charge level of a power storage device (e.g., secondary battery) even when the hybrid vehicle is running in an area where the atmospherics pressure is low, such as high-altitude areas.

The first aspect of the invention relates to a hybrid vehicle having: an internal combustion engine; electric-power drive-force input-output means which is connected to a drive shaft coupled with a drive axle and is connected to an output shaft of the internal combustion engine such that the output shaft of the internal combustion engine is rotatable relative to the drive shaft and which inputs drive force to and receives drive force from the drive shaft and the output shaft of the internal combustion engine while inputting and outputting electric power and drive force; an electric motor that outputs drive force to the drive shaft; a power storage device that powers and is powered by the electric-power drive-force input-output means and the electric motor; atmospheric-pressure detecting means for detecting atmospheric pressure; maximum-dischargeable-electric-power setting means for setting a maximum dischargeable electric power of the power storage device, wherein the maximum-dischargeable-electric-power setting means sets the maximum dischargeable electric power of the power storage device based on a first relation between the maximum dischargeable electric power and a state of the power storage device when the atmospheric pressure detected by the atmospheric-pressure detecting means is equal to or higher than a predetermined atmospheric pressure and the maximum-dischargeable-electric-power setting means sets the maximum dischargeable electric power based on a second relation between the maximum dischargeable electric power and the state of the power storage device when the atmospheric pressure detected by the atmospheric-pressure detecting means is lower than the predetermined atmospheric pressure, the second relation being formulated such that the maximum dischargeable electric power of the power storage device is set smaller than it is by the first relation; and controlling means for controlling the internal combustion engine, the electric-power drive-force input-output means, and the electric motor such that a required drive force is produced to propel the hybrid vehicle without discharging electric power from the power storage device beyond the maximum dischargeable electric power.

According to the hybrid vehicle described above, when the atmospheric pressure is equal to or higher than the predetermined atmospheric pressure, the maximum dischargeable electric power of the power storage device is set using the first relation between the maximum dischargeable electric power and the state of the power storage device, and then the internal combustion engine, the electric-power drive-force input-output means, and the electric motor are controlled such that the required drive force is produced to propel the hybrid vehicle without discharging electric power from the power storage device beyond the maximum dischargeable electric power. On the other hand, when the atmospheric pressure is lower than the predetermined atmospheric pressure, the maximum dischargeable electric power of the power storage device is set using the second relation between the maximum dischargeable electric power and the state of the power storage device. The second relation is formulated such that the maximum dischargeable electric power of the power storage device is set smaller than it is by the first relation. Then, the internal combustion engine, the electric-power drive-force input-output means, the electric motor are controlled such that the required drive force is produced to propel the hybrid vehicle without discharging electric power from the power storage device beyond the maximum dischargeable electric power. As such, an excessive decrease in the charge level of the power storage device can be prevented even when the hybrid vehicle is running in an area where the atmospheric pressure low, such as high-altitude areas.

The above-described hybrid vehicle may be such that: the first relation is such that, when the charge level of the power storage device is within a given range that ranges from a first reference charge level as a lower limit, the lower the charge level of the power storage device, the smaller the maximum dischargeable electric power of the power storage device is made; and the second relation is such that, when the charge level of the power storage device is within a given range that ranges from, as a lower limit, a second reference charge level that is higher than the first reference charge level, the lower the charge level of the power storage device, the smaller the maximum dischargeable electric power of the power storage device is made. Further, the above-described hybrid vehicle may be such that: the first relation is such that, when the charge level of the power storage device is lower than a third reference charge level, the lower the charge level of the power storage device, the smaller the maximum dischargeable electric power of the power storage device is made; and the second relation is such that, when the charge level of the power storage device is lower than a fourth reference charge level that is higher than the third reference charge level, the lower the charge level of the power storage device, the smaller the maximum dischargeable electric power of the power storage device is made.

Further, the above-described hybrid vehicle may be such that the second relation is such that the lower the atmospheric pressure detected by the atmospheric pressure detecting means, the smaller the maximum dischargeable electric power of the power storage device is made. In this case, an excessive decrease in the charge level of the power storage device can be more appropriately prevented in accordance with the atmospheric pressure.

Further, the above-described hybrid vehicle may be such that the electric-power drive-force input-output means has a power generator that inputs and outputs drive forces and a three-shaft drive-force input-output mechanism that is connected to the drive shaft, the output shaft of the internal combustion engine, and a rotational shaft of the power generator and inputs drive force to or outputs drive force from one of the three shafts based on drive forces input to and output from the other two shafts.

The second aspect of the invention relates to a method for controlling a hybrid vehicle having: an internal combustion engine; an electric-power drive-force inputting-outputting device which is connected to a drive shaft coupled with a drive axle and is connected to an output shaft of the internal combustion engine such that the output shaft of the internal combustion engine is rotatable relative to the drive shaft and which inputs drive force to and receives drive force from the drive shaft and the output shaft of the internal combustion engine while inputting and outputting electric power and drive force; an electric motor that outputs drive force to the drive shaft; and a power storage device that powers and is powered by the electric-power drive-force inputting-outputting device and the electric motor. According to this method, atmospheric pressure is detected, when the detected atmospheric pressure is equal to or higher than a predetermined atmospheric pressure, a maximum dischargeable electric power of the power storage device is set based on a first relation between the maximum dischargeable electric power and a state of the power storage device, and the internal combustion engine, the electric-power drive-force inputting-outputting device, and the electric motor are controlled such that a required drive force is produced to propel the hybrid vehicle without discharging electric power from the power storage device beyond the maximum dischargeable electric power. On the other hand, when the detected atmospheric pressure is lower than the predetermined atmospheric pressure, the maximum dischargeable electric power is set based on a second relation between the maximum dischargeable electric power and the state of the power storage device that is formulated such that the maximum dischargeable electric power of the power storage device is set smaller than it is by the first relation, and the internal combustion engine, the electric-power drive-force inputting-outputting device, and the electric motor are controlled such that the required drive force is produced to propel the hybrid vehicle without discharging electric power from the power storage device beyond the maximum dischargeable electric power.

According to the hybrid-vehicle control method described above, when the atmospheric pressure is equal to or higher than the predetermined atmospheric pressure, the maximum dischargeable electric power of the power storage device is set using the first relation between the maximum dischargeable electric power and the state of the power storage device, and then the internal combustion engine, the electric-power drive-force inputting-outputting device, and the electric motor are controlled such that the required drive force is produced to propel the hybrid vehicle without discharging electric power from the power storage device beyond the maximum dischargeable electric power. On the other hand, when the atmospheric pressure is lower than the predetermined atmospheric pressure, the maximum dischargeable electric power of the power storage device is set using the second relation between the maximum dischargeable electric power and the state of the power storage device. The second relation is formulated such that the maximum dischargeable electric power of the power storage device is set smaller than it is by the first relation. Then, the internal combustion engine, the electric-power drive-force inputting-outputting device, the electric motor are controlled such that the required drive force is produced to propel the hybrid vehicle without discharging electric power from the power storage device beyond the maximum dischargeable electric power. As such, an excessive decrease in the charge level of the power storage device can be prevented even when the hybrid vehicle is running in an area where the atmospheric pressure low, such as high-altitude areas.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Figure 1:
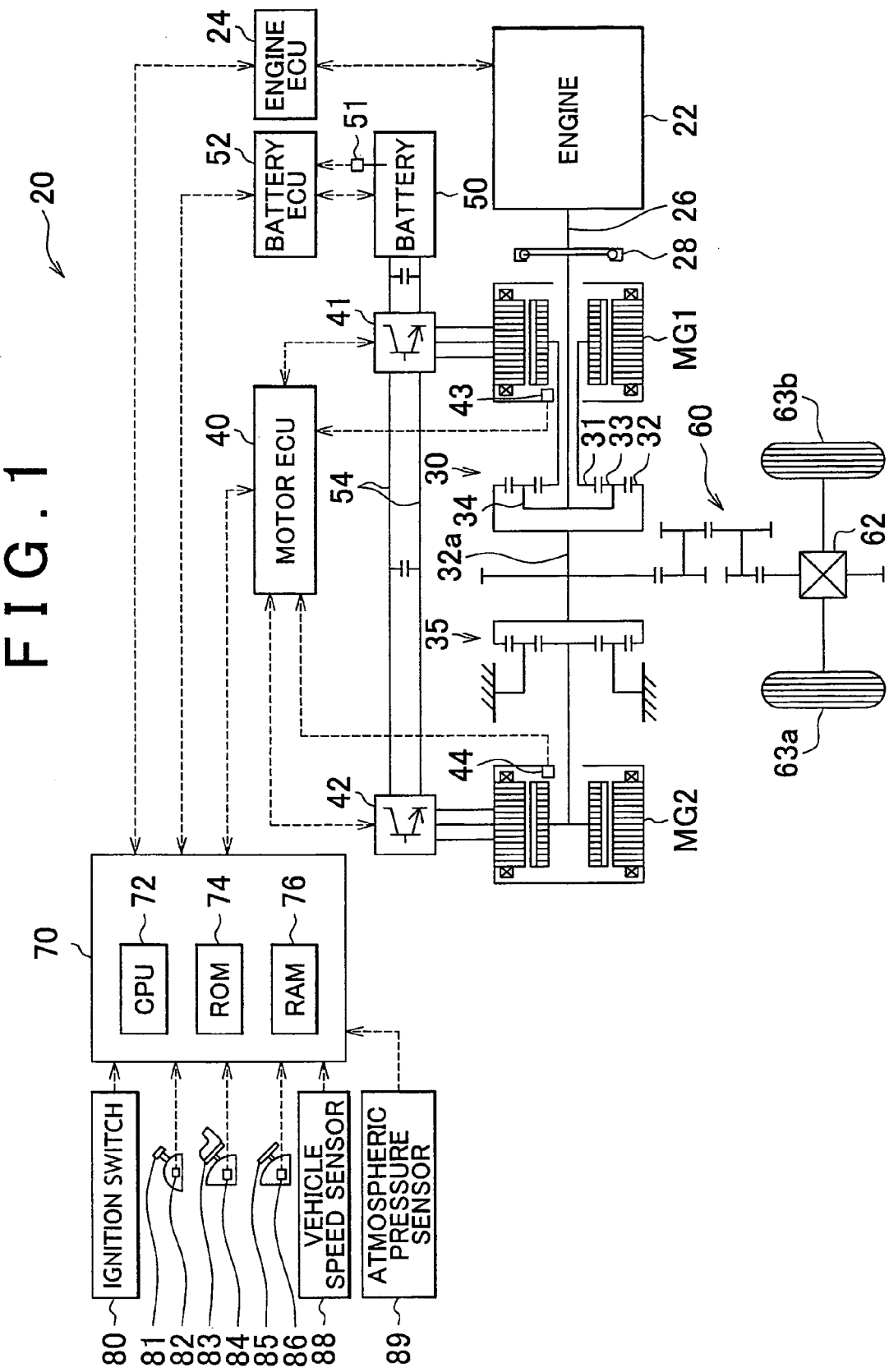
FIG. 1 is a view schematically showing the configuration of a hybrid vehicle 20 according to an example embodiment of the invention.

FIG. 1 schematically shows the configuration of a hybrid vehicle 20 according to an example embodiment of the invention. Referring to FIG. 1, the hybrid vehicle 20 has: an engine 22; a drive-force distribution mechanism 30 that is connected to a crankshaft 26, which is the output shaft of the engine 22, via a damper 28; a first electric motor MG1 that is connected to the drive-force distribution mechanism 30 and is adapted to generate electric power; a reduction gear unit 35 that is provided on a ring-gear shaft 32a that serves as a drive shaft and is connected to the drive-force distribution mechanism 30; a second electric motor MG2 connected to the reduction gear unit 35; and a hybrid ECU (Electronic Control Unit) 70 that controls the entire operation of the hybrid vehicle 20.

The engine 22 is an internal combustion engine that runs on hydrocarbon fuel (e.g., gasoline, light oil) to produce drive force under various operation controls, such as fuel-injection control, ignition control, intake amount adjustment control, and so on, that are executed by an engine ECU 24. The engine ECU 24 receives signals from various sensors for detecting the operation state of the engine 22, such as a crank position sensor (not shown in the drawings) that detects the rotational angle of the crankshaft 26 of the engine 22. The engine ECU 24 communicates with the hybrid ECU 70 and controls the operation of the engine 22 based on the control signals from the hybrid ECU 70 and provides the hybrid ECU 70 with various data regarding the operation state of the engine 22 as needed. The engine ECU 24 calculates the rotation speed of the crankshaft 26, which indicates an engine speed Ne of the engine 22, based on the rotational position of the crankshaft 26 indicated by the signals output from the crank position sensor.

The drive-force distribution mechanism 30 is a planetary gear mechanism constituted of a sun gear 31 that is an external gear, a ring gear 32 that is an internal gear and is coaxial with the sun gear 31, pinions 33 that are in mesh with the sun gear 31 and the ring gear 32, and a carrier 34 on which the pinions 33 are supported so as to rotate while moving around the sun gear 31. Thus structured, the drive-force distribution mechanism 30 provides differential functions using the sun gear 31, the ring gear 32, and the carrier 34 as rotational elements. The crankshaft 26 of the engine 22 is connected to the carrier 34, the first electric motor MG1 is connected to the sun gear 31, the reduction gear unit 35 is connected to the ring gear 32 via the ring gear shaft 32a. When the first electric motor MG1 operates as a generator, the drive force input from the engine 22 to the carrier 34 is distributed to the sun gear 31 and to the ring gear 32 according to the gear ratio between the sun gear 31 and the ring gear 32. On the other hand, when the first electric motor MG1 operates as a motor, the drive force input from the engine 22 to the carrier 34 and the drive force input from the first electric motor MG1 to the sun gear 31 are combined and then output to the ring gear 32. The drive force output to the ring gear 32 is finally transferred to drive wheels 63a, 63b of the hybrid vehicle 20 via the ring gear shaft 32a, a gear mechanism 60, and a differential gear unit 62.

The electric motors MG1, MG2 are both a synchronous motor-generator operable as both a motor and a generator. The electric motors MG1, MG2 are arranged to power and be powered by a battery 50 via invertors 41, 42, respectively. A power line 54 is provided between the inverter 41, the inverter 42, and the battery 50. The power line 54 is constituted of a positive bus and a negative bus shared by the inverters 41, 42, and the power generated by one of the electric motors MG1, MG2 can be consumed by the other through the power line 54. Thus, the battery 50 is charged with the electric power generated by the first electric motor MG1 and/or the electric power generated by the second electric motor MG2 and discharges power to compensate for power shortages at the first electric motor MG1 and/or at the second electric motor MG2. Note that such power charge and discharge of the battery 50 are not necessarily performed in a case where the motor generators MG1 and MG2 are adapted to power each other to make power balance therebetween. The electric motors MG1, MG2 are both controlled by a motor ECU 40. The motor ECU 40 receives various signals for the drive control of the electric motors MG1, MG2 such as the signals output from a rotational position sensor 43 for detecting the rotational position of the rotor of the first electric motor MG1 and a rotational position sensor 44 for detecting the rotational position of the rotor of the second electric motor MG2 and the signals output from current sensors (not shown in the drawings) that detect the phase current supplied to the electric motors MG1, MG2.

The motor ECU 40 outputs switching signals to the inverters 41, 42. The motor ECU 40 communicates with the hybrid ECU 70 and controls the electric motors MG1, MG2 according to the control signals output from the hybrid ECU 70 and provides, when necessary, the hybrid ECU 70 with various data regarding the operation states of the electric motors MG1, MG2. The motor ECU 40 calculates a rotation speed Nm1 of the first electric motor MG1 and a rotation speed Nm2 of the second electric motor MG2 based on the signals output from the rotational position sensors 43, 44.

The battery 50 is managed by a battery ECU 52. The battery ECU 52 receives various signals for the control of the battery 50, such as the signals output from a voltage sensor (not shown in the drawings) that is provided between the terminals of the battery 50 to detect the voltage between the terminals, the signals output from a battery current sensor (not shown in the drawings) that is provided on the power line 54 connected to the output terminal of the battery 50 and detects the current discharged from the battery 50 and the current supplied to the battery 50, and the signals output from a temperature sensor 51 that is attached on the battery 50 to detect a temperature Tb of the battery 50. The battery ECU 52 provides, when necessary, the hybrid ECU 70 with various data regarding the state of the battery 50. The battery ECU 52 calculates the charge level SOC of the battery 50 by accumulating the charging and discharging currents detected by the battery current sensor.

Meanwhile, referring to FIG. 1, the hybrid ECU 70 is a microprocessor incorporating a CPU (Central Processing Unit) 72 as the main component, a ROM (Read Only Memory) 74 storing various operation and control programs, a RAM (Random Access Memory) 76 for temporarily storing various data, an input port (not shown in the drawings), an output port (not shown in the drawings), and a communication port (not shown in the drawings). The hybrid ECU 70 receives, via the input port, various signals including: ignition signals output from an ignition switch 80; the signals output from a shift position sensor 82 for detecting the shift position of a shift lever 81, the signals from an accelerator-pedal position sensor 84 for detecting an accelerator operation amount Acc indicating the travel of an accelerator pedal 83; the signals output from a brake-pedal position sensor 86 for detecting a brake-pedal position BP indicating the travel of the brake pedal 85; the signals output from the vehicle speed sensor 88 for detecting the vehicle speed V; and the signals output from an atmospheric pressure sensor 89 for detecting an atmospheric pressure Pa. As mentioned earlier, the hybrid ECU 70 is connected via the communication port to the engine ECU 24, the motor ECU 40, and the battery ECU 52 and exchanges various control signals and various data with them.

Configured as described above, the hybrid vehicle 20 calculates the torque required to be output to the ring gear shaft 32a, which is the drive shaft, based on the accelerator operation amount Acc corresponding to the travel of the accelerator pedal 83 depressed by the driver and the vehicle speed V and then controls the engine 22 and the electric motors MG1, MG2 so as to output drive force corresponding to the required torque to the ring gear shaft 32a. The engine 22 and the electric motors MG1, MG2 are operated in the following operation modes. The first mode is a torque conversion operation mode in which the engine 22 is controlled so as to output drive force corresponding to the required drive force while controlling the electric motors MG1, MG2 such that the drive force output from the engine 22 is entirely converted into torque via the drive-force distribution mechanism 30 and the electric motors MG1, MG2 and then output to the ring gear shaft 32a. The second operation mode is a charge-discharge operation mode in which the engine 22 is controlled so as to output drive force corresponding to the sum of the required drive force and the drive force necessary for charging or discharging of the battery 50 while controlling the electric motors MG1, MG2 such that the drive force output from the engine 22 is entirely, or partially, converted into torque via the drive-force distribution mechanism 30 and the electric motors MG1, MG2 and then output to the ring gear shaft 32a. The third mode is a motor drive mode in which the engine 22 is stopped and the second electric motor MG2 is controlled so as to output drive force corresponding to the required drive force to the ring gear shaft 32a.

Figure 2:
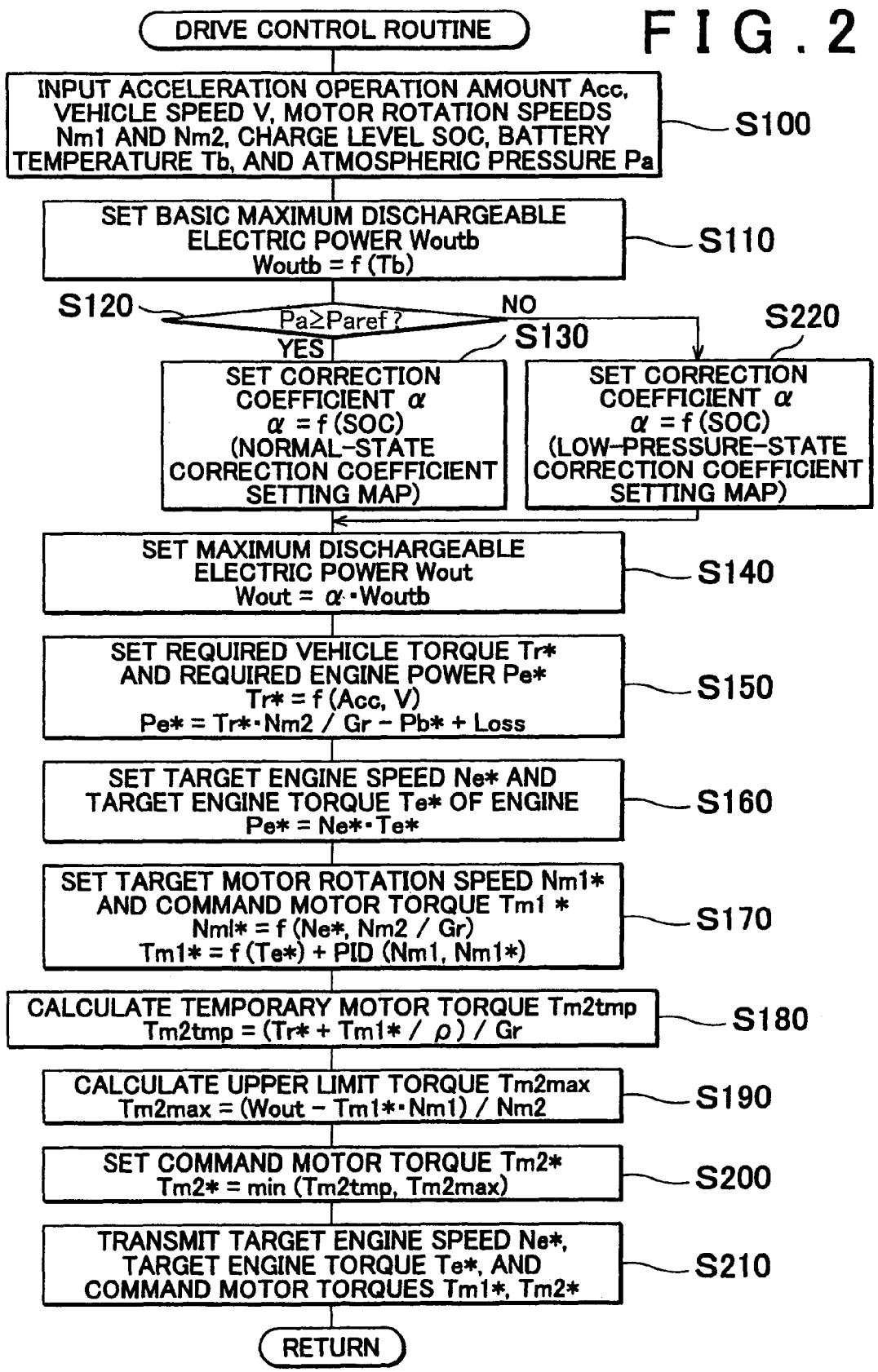
FIG. 2 is a flowchart illustrating an example of a drive control routine executed by a hybrid ECU 70.

Next, the operation of the hybrid vehicle 20 configured as described above will be described. The flowchart of FIG. 2 illustrates an example of a drive control routine executed by the hybrid ECU 70. This routine is repeatedly executed at given time intervals (e.g., several milliseconds).

After the start of the drive control routine, the CPU 72 of the hybrid ECU 70 first executes processes for obtaining various data for control, including the accelerator operation amount Acc detected by the accelerator-pedal position sensor 84, the vehicle speed V detected by the vehicle speed sensor 88, the rotation speeds Nm1, Nm2 of the electric motors MG1, MG2, the charge level SOC of the battery 50, the battery temperature Tb, and the atmospheric pressure Pa (step S100). More specifically, the rotation speed Nm1 of the first electric motor MG1 and the rotation speed Nm2 of the second electric motor MG2 are calculated by the motor ECU 40 based on the rotational positions of the rotors of the electric motors MG1, MG2 and then output to the CPU 72 by communication. The charge level SOC of the battery 50 is calculated by the battery ECU 52 based on the accumulative value of the charging-discharging currents detected by the battery current sensor (not shown in the drawings) and then output to the CPU 72 by communication. The battery temperature Tb is detected by the temperature sensor 51 and then output to the CPU 72 via the battery ECU 52.

Figure 3:
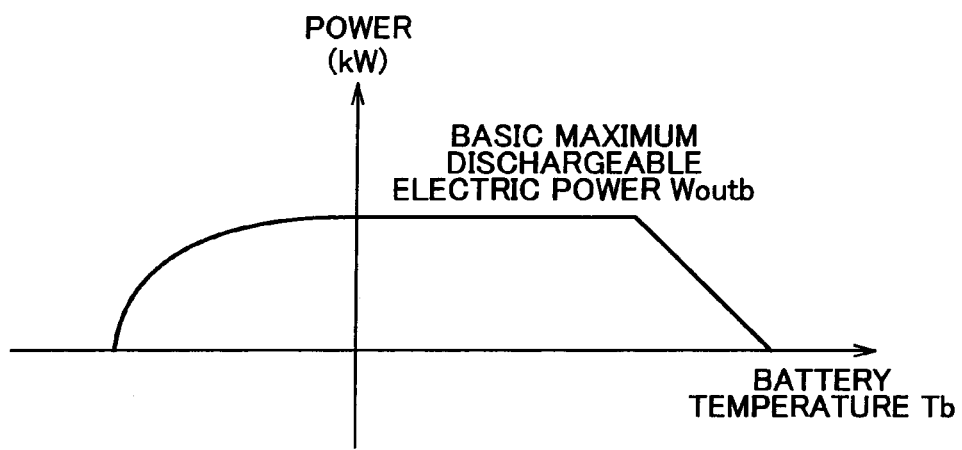
FIG. 3 is an example of a basic maximum dischargeable electric power setting map.

Obtaining the data described above, the CPU 72 then sets, based on the battery temperature Tb, a basic maximum dischargeable electric power Woutb that is a basic value of the maximum power that is allowed to be discharged from the battery 50 (step S110). Then, the CPU 72 compares the atmospheric pressure Pa with a threshold pressure Paref (step S120). With regard to the setting of the basic maximum dischargeable electric power Woutb, a relation between the battery temperature Tb and the basic maximum dischargeable electric power Woutb is prepared in advance and stored in the ROM 74 as a map for setting the basic maximum dischargeable electric power Woutb (will be referred to as "basic maximum dischargeable electric power setting map" where necessary), and in operation, the CPU 72 sets the basic maximum dischargeable electric power Woutb by applying the battery temperature Tb to the basic maximum dischargeable electric power setting map. FIG. 3 shows one example of the basic maximum dischargeable electric power setting map. The threshold pressure Paref is referenced when determining whether the drive force of the engine 22 is likely to become smaller than the target drive force. The threshold pressure Paref is set to, for example, a pressure slightly lower than a standard pressure that is 1013 hPa, for example. Hereinafter, the power output from the engine 22 when the atmospheric pressure Pa is equal to the standard atmospheric pressure will be referred to as "engine power Pe", and in the hybrid vehicle 20, this engine power Pe is controlled through the intake air mount control, the fuel injection control, and so on, such that it equals a required engine power Pe*. When the atmospheric pressure Pa is relatively low, the density of air drawn into the engine 22 is low, and therefore the engine power Pe tends to be smaller than the required engine power Pe*. That is, the comparison between the atmospheric pressure Pa and the threshold pressure Paref in step S120 is made to determine whether the engine power Pe is likely to become smaller than required engine power Pe*.

Figure 4:
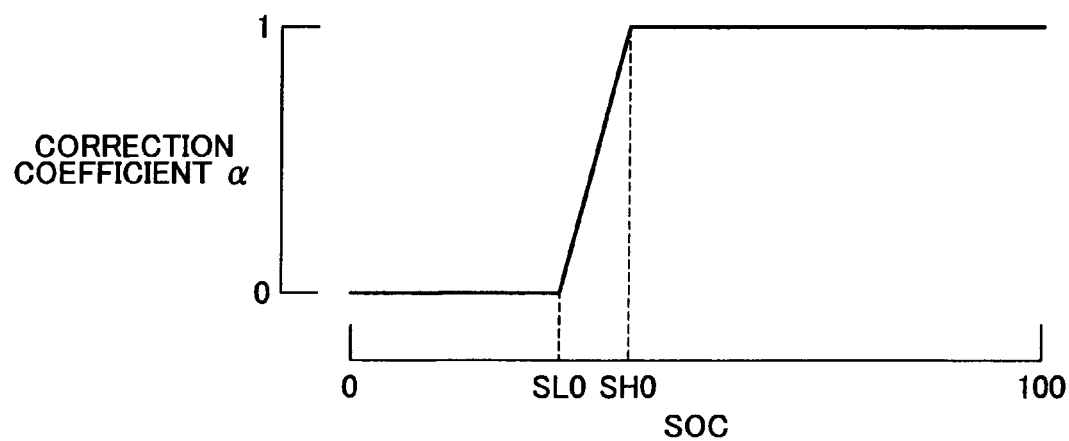
FIG. 4 is an example of a normal-state correction coefficient setting map.

That is, if it is determined in step S120 that the atmospheric pressure Pa is equal to or higher than the threshold pressure Paref, the CPU 72 determines that the engine power Pe is not likely to become smaller than required engine power Pe*, and then the CPU 72 sets a correction coefficient α based on the charge level SOC of the battery 50 (step S130). Then, the CPU 72 calculates a maximum dischargeable electric power Wout, which represents the maximum electric power allowed to be discharged from the battery 50, by multiplying the basic maximum dischargeable electric power Woutb by the correction coefficient α (step S140). The above-described setting of the correction coefficient α is performed as follows. First, a relation between the charge level SOC of the battery 50 and the correction coefficient α is prepared in advance and stored in the ROM 74 as a map for setting the correction coefficient α (will be referred to as "normal-state correction coefficient setting map" where necessary). In operation, the CPU 72 sets the correction coefficient α by applying the charge level SOC of the battery 50 to the normal-state correction coefficient setting map. FIG. 4 shows one example of the normal-state correction coefficient setting map. Referring to FIG. 4, the correction coefficient α is set to 1 when the charge level SOC of the battery 50 is equal to or higher than SH0 and to 0 when the charge level SOC of the battery 50 is lower than SL0 that is lower than SH0, and the correction coefficient α is made smaller within the range of 0 to 1 the lower the charge level SOC when the charge level SOC is lower than SH0 but equal to or higher than SL0. According to the normal-state correction coefficient setting map, therefore, the maximum dischargeable electric power Wout is set equal to the basic maximum dischargeable electric power Woutb when the charge level SOC of the battery 50 is equal to or higher than SH0, and the maximum dischargeable electric power Wout is set to 0 when the charge level SOC of the battery 50 is lower than SL0, and the maximum dischargeable electric power Wout is made smaller within the range of 0 to the basic maximum dischargeable electric power Woutb the lower the charge level SOC when the charge level SOC is lower than SH0 but equal to or higher than SL0. For example, SH0 is set to 37% or 40%, and SL0 is set to 30% or 33%.

Figure 5:
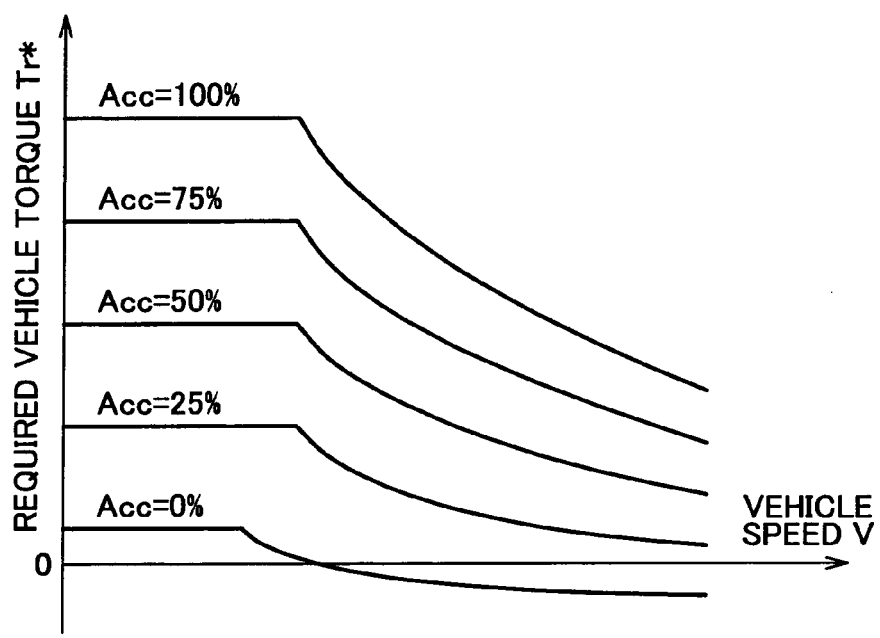
FIG. 5 is an example of a required vehicle torque setting map.

After the maximum dischargeable electric power Wout of the battery 50 has been set as described above, the CPU 72 then sets a required vehicle torque Tr* and the required engine power Pe* (step S150). The required vehicle torque Tr* represents the torque that is required to be output to the ring gear shaft 32a connected to the drive wheels 63a, 63b and is determined based on the accelerator operation amount Acc and the vehicle speed V, and the required engine power Pe* represents the required power of the engine 22. More specifically, the setting of the required vehicle torque Tr* is performed as follows. First, a relation between the required vehicle torque Tr*, the accelerator operation amount Acc, and the vehicle speed V is prepared in advance and stored in the ROM 74 as a map for setting the required vehicle torque Tr* (will be referred to as "required vehicle torque setting map" where necessary). In operation, the CPU 72 sets the required vehicle torque Tr* by applying the acceleration operation amount Acc and the vehicle speed V to the required vehicle torque setting map. FIG. 5 shows one example of the required vehicle torque setting map. The required engine power Pe* is calculated by, for example, multiplying the required vehicle torque Tr* by a rotation speed Nr of the ring gear shaft 32a and then subtracting a required charge-dischargeable electric power Pb* from the product and then adding Loss to the difference. Note that the rotation speed Nr of the ring gear shaft 32a can be obtained by multiplying the vehicle speed V by a conversion coefficient k or by dividing the rotation speed Nm2 of the second electric motor MG2 by a gear ratio Or of the reduction gear unit 35.

Figure 6:
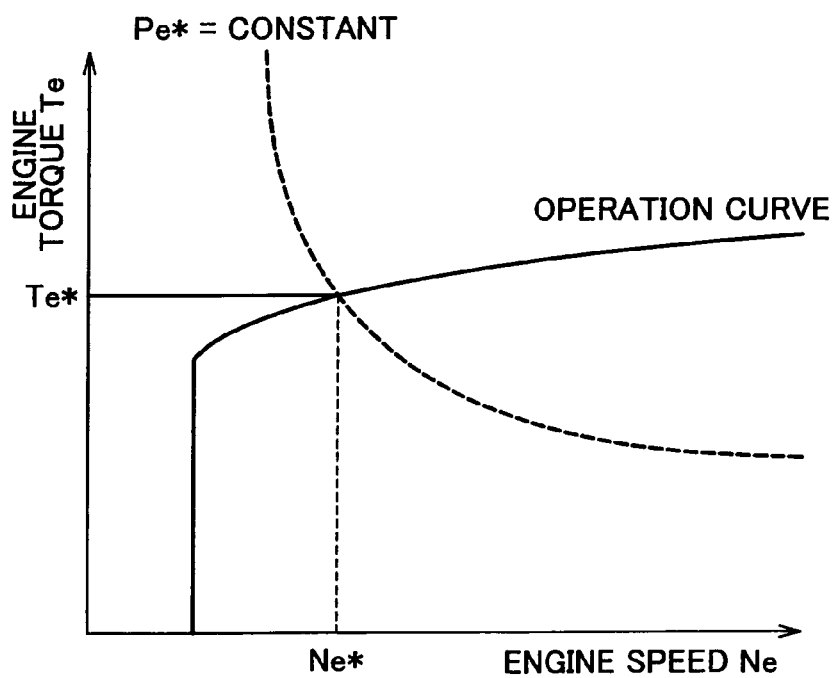
FIG. 6 is a chart indicating an example of an operation curve and illustrating how a target engine speed Ne* and a target engine torque Te* of an engine 22 are set.

Then, the CPU 72 sets a target engine speed Ne* and a target engine torque Te* of the engine 22 based on the required engine power Pe* (step S160). That is, the target engine speed Ne* and the target engine torque Te* together define the target operation point of the engine 22. This setting is performed based on an operation curve prescribed for efficient operation of the engine 22 and based on the target power Pe*. FIG. 6 illustrates an example of the operation curve and how the target engine speed Ne* and the target engine torque Te* of the engine 22 are set. Referring to FIG. 6, the target engine speed Ne* and the target engine torque Te* can be set based on the intersection point between the operation curve and a constant curve of the target engine power Pe* (Ne*× Te*).

Figure 7:
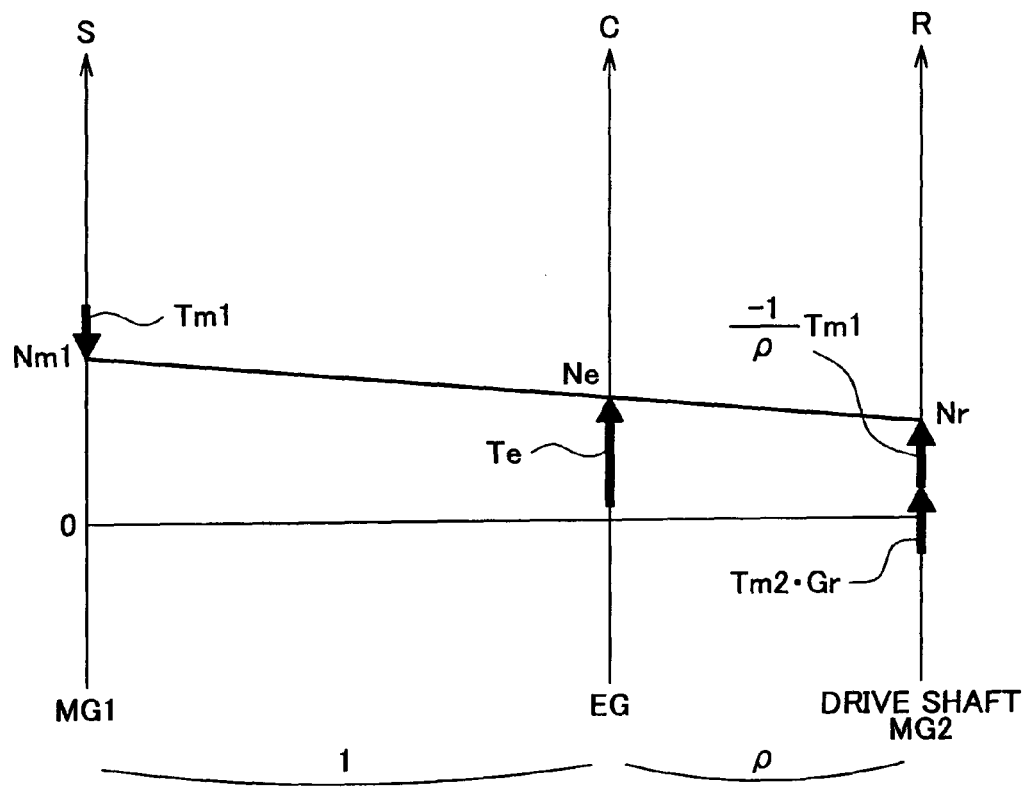
FIG. 7 is an example of an alignment chart illustrating the dynamic relation between the rotation speed and the torque of each rotational element of a drive-force distribution mechanism 30 when a hybrid vehicle 20 is running while outputting drive force from the engine 22.

Next, using the expression (1) indicated below, a target rotation speed Nm1* of the first electric motor MG1 will be calculated from the target engine speed Ne* of the engine 22, the rotation speed Nm2 of the second electric motor MG2, a gear ratio p of the drive-force distribution mechanism 30, and the gear ratio Gr of the reduction gear unit 35. Then, using the expression (2) indicated below, a command torque Tm1* of the first electric motor MG1 is calculated from the target rotation speed Nm1* calculated as described above, the rotation speed Nm1 of the first electric motor MG1 obtained, the target engine torque Te* of the engine 22, and the gear ratio ρ of the drive-force distribution mechanism 30 (step S170). The expression (1) is a dynamic relational expression of the rotational elements of the drive-force distribution mechanism 30. FIG. 7 shows an example of an alignment chart illustrating the dynamic relation between the rotation speed and the torque of each rotational element of the drive-force distribution mechanism 30 when the hybrid vehicle 20 is running while outputting drive force from the engine 22. In FIG. 7, the axis S on the left represents the rotation speed of the sun gear 31 indicating the rotation speed Nm1 of the first electric motor MG1, the axis C represents the rotation speed of the carrier 34 indicating the speed Ne of the engine 22, and the axis R represents the rotation speed Nr of the ring gear 32 that is obtained by dividing the rotation speed Nm2 of the second electric motor MG2 by the gear ratio Gr of the reduction gear unit 35. The expression (1) can be easily formulated from this alignment chart. The two bold arrows on the axis R represent the torque allocated to the ring gear shaft 32a from the torque Tm1 output from the first electric motor MG1 and the torque allocated, via the reduction gear unit 35, to the ring gear shaft 32a from the torque Tm2 output from the second electric motor MG2. The expression (2) represents a relation used in the feedback control for driving the first electric motor MG1 to rotate at the target rotation speed Nm1*. In the expression (2), "k1" at the second term of the right side is a proportional gain and "k2" at the third term on the right side is an integral gain.

$$Nm1^* = Ne^* \cdot (1+\rho)/\rho - Nm2/(Gr \cdot \rho) \quad (1)$$

$$Tm1^* = -\rho \cdot Te^*/(1+\rho) + k1(Nm1^* - Nm1) + k2\int(Nm1^* - Nm1)dt \quad (2)$$

Then, using the expression (3) indicated below, a temporary torque Tm2tmp, which is a temporary value of the torque required to be output from the second electric motor MG2, is calculated by dividing the set command torque Tm1* by the gear ratio ρ of the drive-force distribution mechanism 30 and then adding the quotient to the required vehicle torque Tr* and then dividing the sum by the gear ratio Gr of the reduction gear unit (step S180). Then, using the expression (4) indicated below, an upper limit torque Tm2max representing the upper limit of torque allowed to be output from the second electric motor MG2 is calculated by obtaining the power consumption (generated power) of the first electric motor MG1 by multiplying the set command torque Tm1* by the present rotation speed Nm1 of the first electric motor MG1 and then dividing the difference between the maximum dischargeable electric power Wout of the battery 50 and the obtained power consumption of the first electric motor MG1 by the rotation speed Nm2 of the second electric motor MG2 (step S190). Then, a command torque Tm2* of the second electric motor MG2 is set by limiting the temporary torque Tm2tmp by the upper limit torque Tm2max (step S200). Note that the expression (3) can be easily formulated from the alignment chart of FIG. 7.

$$Tm2tmp = (Tr^* + Tm1^*/\rho)/Gr \quad (3)$$

$$Tm2max = (Wout - Tm1^* \cdot Nm1)/Nm2 \quad (4)$$

After setting the target engine speed Ne* and the target engine torque Te* of the engine 22, the command torque Tm1* of the electric motor MG1, and the command torque Tm2* of the electric motor MG2 as described above, the CPU 72 transmits the target engine speed Ne* and the target engine torque Te* of the engine 22 to the engine ECU 24 and transmits the command torque Tm1* of the electric motor MG1 and the command torque Tm2* of the electric motor MG2 to the motor ECU 40 (step S210), after which the CPU 72 finishes the drive control routine. Receiving the target engine speed Ne* and the target engine torque Te* from the CPU 72, the engine ECU 24 executes the intake amount control, the fuel injection control, the ignition control, etc., on the engine 22 so as to operate the engine 22 at the target operation point defined by the target engine speed Ne* and the target engine torque Te* of the engine 22. On the other hand, receiving the command torque Tm1* and the command torque Tm2* from the CPU 72, the motor ECU 40 executes the switching control for the invertors 41, 42 such that the electric motor MG1 produces the command torque Tm1* and the electric motor MG2 produces the command torque Tm2*. Through such control, the required vehicle torque Tr* for propelling the hybrid vehicle 20 is output to the ring gear shaft 32a, which serves as the drive shaft, from the engine 22, the first electric motor MG1, and the second electric motor MG2 without discharging electric power from the battery 50 beyond the maximum dischargeable electric power Wout of the battery 50.

Figure 8:
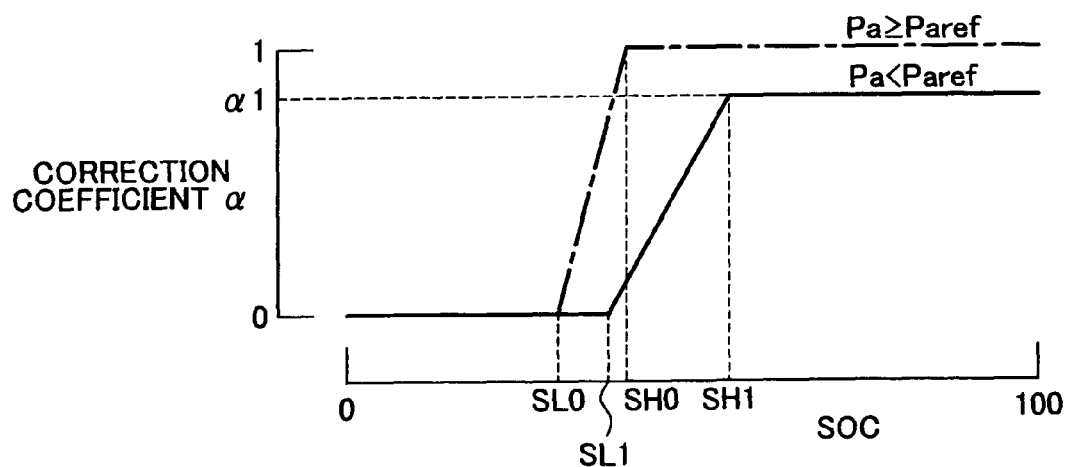
FIG. 8 is an example of a low-pressure-state correction coefficient setting map.

Referring back to step S120, if it is determined in this step that the atmospheric pressure Pa is lower than the threshold pressure Paref, the CPU 72 determines that the engine power Pe is likely to become smaller than the required engine power Pe*, and then the CPU 72 sets the correction coefficient α based on the charge level SOC of the battery 50 (step S220). Then, the CPU 72 calculates the maximum dischargeable electric power Wout of the battery 50 by multiplying the basic maximum dischargeable electric power Woutb by the correction coefficient α (step S140). Then, the CPU 72 executes the processes of step S150 to step S210 using the maximum dischargeable electric power Wout, after which the CPU 72 finishes the drive control routine. This setting of the correction coefficient α is performed as follows. First, a relation between the charge level SOC of the battery 50 and the correction coefficient α is prepared in advance and stored in the ROM 74 as a map for setting the correction coefficient α (will be referred to as "lower-pressure-state correction coefficient setting map" where necessary), and the CPU 72 sets correction coefficient α by applying the charge level SOC of the battery 50 to the lower-pressure-state correction coefficient setting map. FIG. 8 shows one example of the low-pressure-state correction coefficient setting map. Note that the normal-state correction coefficient setting map that is used when the atmospheric pressure Pa is equal to or higher than the threshold pressure Paref is indicated by the dotted lines for reference in FIG. 8. Referring to FIG. 8, the correction coefficient α is set to a constant value a1 that is smaller than 1 when the charge level SOC is equal to or higher than SH1 that is higher than SH0, the correction coefficient α is set to 0 when the charge level SOC is lower than SL1 that is higher than SL0 but lower than SH1, and the correction coefficient α is made smaller within the range of 0 to α1 the lower the charge level SOC when the charge level SOC is lower than SH1 but equal to or higher than SL1. As such, when the atmospheric pressure Pa is lower than the threshold pressure Paref, the maximum dischargeable electric power Wout is made lower than it is when the atmospheric pressure Pa is equal to or higher than the threshold pressure Paref. Note that in this example it is assumed that the atmospheric pressure Pa is presently lower than the standard atmospheric pressure (e.g., 1013 hPa). That is, when the atmospheric pressure Pa is lower than the threshold pressure Paref, it is considered that the output power of the engine 22 becomes smaller than the required engine power Pe* as mentioned above, and therefore the output toque of the engine 22 is lower than it is when the atmospheric pressure Pa is near the standard atmospheric pressure. For this reason, the command torque Tm1* of the first electric motor MG1, which is calculated as the torque required for the first electric motor MG1 to rotate at the target rotation speed Nm1*, is made larger than it is when the atmospheric pressure Pa is near the standard atmospheric pressure (it is made smaller when the torque of the first electric motor MG1 is used for power generation), and therefore the temporary torque Tm2tmp of the second electric motor MG2, which is calculated by the expression (3) using the command torque Tm1*, increases. As such, as compared to when the atmospheric pressure Pa is near the standard atmospheric pressure, the electric power generated by the first electric motor MG1 decreases while the electric power consumed by the second electric motor MG2 increases, biasing the balance between power discharge and power charge of the battery 50 to the power-discharge side with respect to the required charge-discharge electric power Pb*. In view of this fact, in this example embodiment of the invention, when the atmospheric pressure Pa is lower than the threshold pressure Paref, the maximum dischargeable electric power Wout of the battery 50 is reduced, and the first electric motor MG1 and the second electric motor MG2 are operated such that electric power is not discharged from the battery 50 beyond the reduced maximum dischargeable electric power Wout. As such, an excessive decrease in the charge level SOC of the battery 50 can be prevented even when the hybrid vehicle 20 is running in an area where the atmospheric pressure is low (e.g., high-altitude area). Further, according to the example embodiment of the invention, when the atmospheric pressure Pa is equal to or higher than the threshold pressure Paref, the maximum dischargeable electric power Wout of the battery 50 is made lower the lower the charge level SOC of the battery 50 when the charge level SOC is lower than SH0 but equal to or higher than SL0, and when the atmospheric pressure Pa is lower than the threshold pressure Paref, the maximum dischargeable electric power Wout of the battery 50 is made smaller the lower the charge level SOC when the charge level SOC is lower than SH1 (>SH0) but equal to or higher than SL1 (>SL0). Therefore, an excessive decrease in the charge level SOC of the battery 50 can be more effectively prevented.

According to the hybrid vehicle 20 of the example embodiment of the invention, as described above, when the atmospheric pressure Pa is lower than the threshold pressure Paref, the correction coefficient α is set based on the charge level SOC of the battery 50 using the low-pressure-state correction coefficient setting map that is formulated such that the maximum electric power allowed to be discharged from the battery 50 is made smaller than it is when the atmospheric pressure Pa is equal to or higher than the threshold pressure Paref, and then the maximum dischargeable electric power Wout of the battery 50 is calculated by multiplying the basic maximum dischargeable electric power Woutb by the correction coefficient α thus set, and then the engine 22 and the electric motors MG1, MG2 are controlled so as to produce the required vehicle torque Tr* without discharging electric power from the battery 50 beyond the maximum dischargeable electric power Wout. As such, an excessive decrease in the charge level SOC of the battery 50 can be prevented even when the hybrid vehicle 20 is running in an area where the atmospheric pressure is low, such as high-altitude areas.

According to the hybrid vehicle 20 of the example embodiment of the invention, as described above, when the atmospheric pressure Pa is equal to or higher than the threshold pressure Paref, the maximum dischargeable electric power Wout of the battery 50 is made smaller the lower the charge level SOC of the battery 50 when the charge level SOC of the battery 50 is lower than SH0 but equal to or higher than SL0, and when the atmospheric pressure Pa is lower than the threshold pressure Paref, the maximum dischargeable electric power Wout of the battery 50 is made lower the lower the charge level SOC of the battery 50 when the charge level SOC of the battery 50 is lower than SH1 (>SH0) but equal to or higher than SL1 (>SL0). However, the maximum dischargeable electric power Wout of the battery may be set in various other manners as long as when the atmospheric pressure Pa is lower than the threshold pressure Paref, the maximum dischargeable electric power Wout of the battery 50 is set smaller than it is when the atmospheric pressure Pa is equal to or higher than the threshold pressure Paref. For example, at least one of SH1 and SL1 that are used when the atmospheric pressure Pa is lower than the threshold pressure Paref may be equal to SH0 and SL0 that are used when the atmospheric pressure Pa is equal to or higher than Paref.

According to the hybrid vehicle 20 of the example embodiment of the invention, as described above, the correction coefficient α is made smaller when the atmospheric pressure Pa is lower than the threshold pressure Paref than when the atmospheric pressure Pa is equal to or higher than the threshold pressure Paref, and the maximum dischargeable electric power Wout of the battery 50 is calculated by multiplying the basic maximum dischargeable electric power Woutb by the correction coefficient α thus set. However, the maximum dischargeable electric power Wout of the battery may be set in various other manners as long as when the atmospheric pressure Pa is lower than the threshold pressure Paref, the maximum dischargeable electric power Wout of the battery 50 is set smaller than it is when the atmospheric pressure Pa is equal to or higher than the threshold pressure Paref. For example, when the atmospheric pressure Pa is lower than the threshold pressure Paref, the maximum dischargeable electric power Wout of the battery 50 may be set by multiplying the basic maximum dischargeable electric power Woutb by a correction coefficient less than 1 instead of the correction coefficient α.

According to the hybrid vehicle 20 of the example embodiment of the invention, as described above, when the atmospheric pressure Pa is lower than the threshold pressure Paref, the correction coefficient α is set using the low-pressure-state correction coefficient setting map that does not reflect the atmospheric pressure Pa. Alternatively, for example, the correction coefficient α may be set using a map that sets the correction coefficient α in accordance with the atmospheric pressure Pa, or the maximum dischargeable electric power Wout of the battery 50 may be set using a map that sets the maximum dischargeable electric power Wout in accordance with the atmospheric pressure Pa. In either case, an excessive decrease in the charge level SOC of the battery 50 can be prevented more appropriately according to the atmospheric pressure Pa.

While the maximum dischargeable electric power Wout of the battery 50 is set based on the charge level SOC of the battery 50 and the battery temperature Tb of the battery 50 in the hybrid vehicle 20 of the example embodiment of the invention, the maximum dischargeable electric power Wout may be set in various other manners as long as when the atmospheric pressure Pa is lower than the threshold pressure Paref, the maximum dischargeable electric power Wout of the battery 50 is set smaller than it is when the atmospheric pressure Pa is equal to or higher than the threshold pressure Paref. For example, the maximum dischargeable electric power Wout may be set based on the voltage between the terminals of the battery 50, the outside temperature, and so on, instead of the charge level SOC of the battery 50, the battery temperature Tb, and the atmospheric pressure Pa.

Further, while the second electric motor MG2 is connected to the ring gear shaft 32a, which serves as the drive shaft, via the reduction gear unit 35 in the hybrid vehicle 20 of the example embodiment of the invention, this structure may be changed as needed. For example, the second electric motor MG2 may be directly connected to the ring gear shaft 32a, or it may be connected to the ring gear shaft 32a via a transmission unit having two, three, four, and so on, of transmission speeds instead of the reduction gear unit 35.

Figure 9:
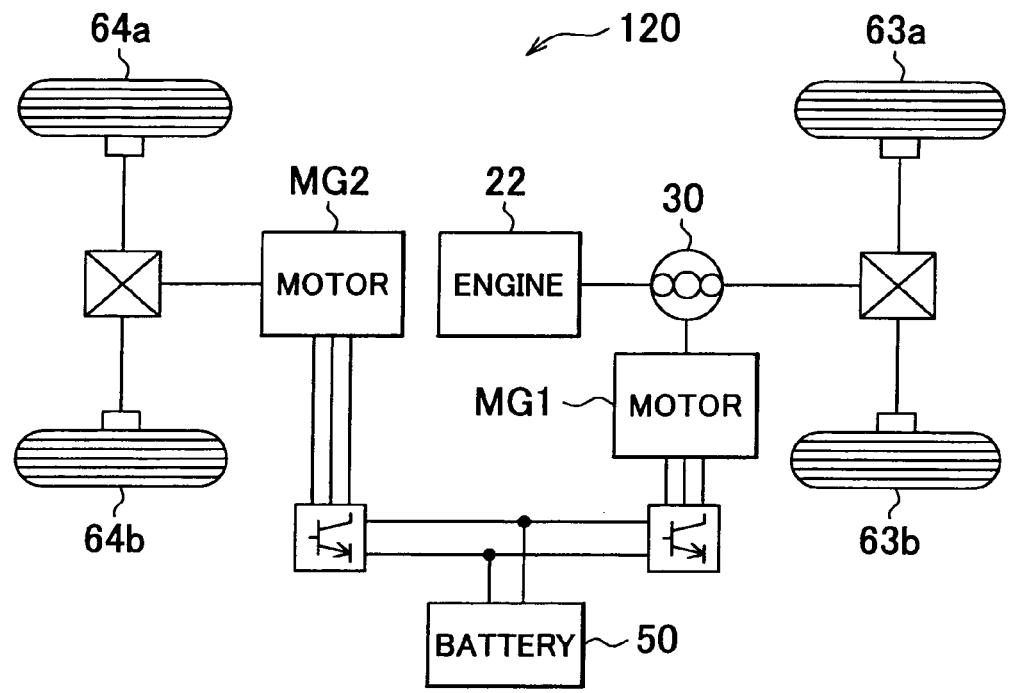
FIG. 9 is a view schematically showing the configuration of a hybrid vehicle 120 that is a modified version of the hybrid vehicle 20 of the example embodiment of the invention.

Further, while the hybrid vehicle 20 of the example embodiment of the invention is structured such that the drive force of the second electric motor MG2 is output to the ring gear shaft 32a while changing the rotation speed of the second electric motor MG2 at the reduction gear unit 35, it may be structured otherwise. For example, the hybrid vehicle 20 may be structured like a hybrid vehicle 120 shown in FIG. 9. Referring to FIG. 9, the hybrid vehicle 120 is structured such that the drive force of the second electric motor MG2 is output to a drive axle (i.e., drive axle connected to the drive wheels 64a, 64b) that is different from the drive axle connected to the ring gear shaft 32a (i.e., drive axle connected to the drive wheels 63a, 63b).

Figure 10:
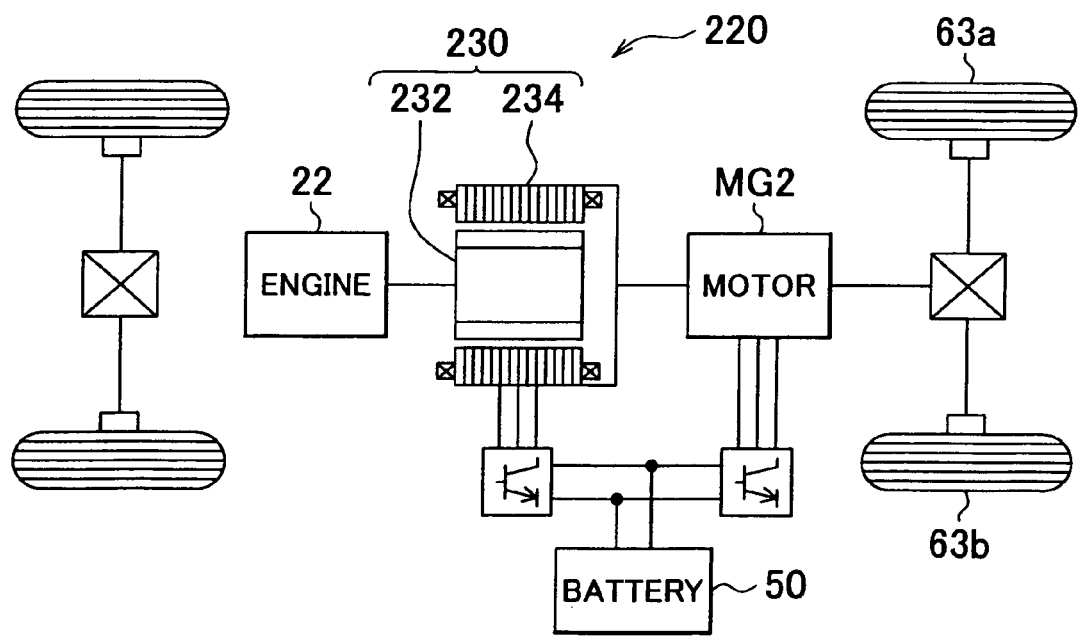
FIG. 10 is a view schematically showing the configuration of a hybrid vehicle 220 that is a modified version of the hybrid vehicle 20 of the example embodiment of the invention.

Further, while the hybrid vehicle 20 of the example embodiment is structured such that the drive force of the engine 22 is output to the ring gear shaft 32a, which serves as the drive shaft and is connected to the drive wheels 63a, 63b, via the drive-force distribution mechanism 30, it may be structured otherwise. For example, the hybrid vehicle 20 may be structured like a hybrid vehicle 220 shown in FIG. 10. Referring to FIG. 10, the hybrid vehicle 220 has a double-rotor electric motor 230 having an inner rotor 232 and an outer rotor 234. The inner rotor 232 is connected to the crankshaft 26 of the engine 22, and the outer rotor 234 is connected to a drive axle via which drive force is output to the drive wheels 63a, 63b. According to this structure, the double-rotor electric motor 230 transfers part of the drive force of the engine 22 to the drive axle while converting the remaining drive force of the engine 22 into electric power.

Further, the invention has been embodied as a hybrid vehicle in the example embodiment described above, the invention may be embodied as a hybrid-vehicle control method.

With regard to the hybrid vehicle 20 of the foregoing example embodiment of the invention, the engine 22 may be regarded as one example of the "internal combustion engine", the drive-force distribution mechanism 30 and the first electric motor MG1 may be together regarded as one example of the "electric-power drive-force input-output means". The second electric motor MG2 may be regarded as one example of the "electric motor". The battery 50 may be regarded as one example of the "power storage device". The atmospheric pressure sensor 89 that detects the atmospheric pressure Pa may be regarded as one example of "atmospheric-pressure detecting means". The hybrid ECU 70 that executes step S110 to step S140, and step S220 of the drive control routine shown in FIG. 2 (i.e., the steps in which the basic maximum dischargeable electric power Woutb, which is the basic value of the maximum electric power allowed to be discharged from the battery 50, is set based on the battery temperature Tb, and then if the atmospheric pressure Pa is equal to or higher than the threshold pressure Paref, the correction coefficient α is set using the normal-state correction coefficient setting map, and if the atmospheric pressure Pa is lower than the threshold pressure Paref, the correction coefficient α is set using the low-pressure-state correction coefficient setting map that is formulated such that the correction coefficient α is made smaller than it is when the atmospheric pressure Pa is equal to or higher than the threshold pressure Paref, and then the maximum dischargeable electric power Wout of the battery 50 is set by multiplying the basic maximum dischargeable electric power Woutb by the correction coefficient α thus set) may be regarded as one example of "maximum-dischargeable-electric-power setting means". The hybrid ECU 70 that executes step S150 to step S210 of the drive control routine shown in FIG. 2 (i.e., the steps in which the target engine speed Ne* and the target engine torque Te* of the engine 22, the command torque Tm1* of the first electric motor MG1, and the command torque Tm2* of the second electric motor MG2 are set such that the required vehicle torque Tr* is output to the ring gear shaft 32a, which serves as the drive shaft, without discharging electric power from the battery 50 beyond the maximum dischargeable electric power Wout, and the set values of the target engine speed Ne* and the target engine torque Te* and the command torques Tm1*, Tm2* are then transmitted to the engine ECU 24 and the motor ECU 40, respectively), the engine ECU 24 that controls the engine 22 based on the set values of the target engine speed Ne* and the target engine torque Te*, and the motor ECU 40 that controls the first electric motor MG1 and the second electric motor MG2 based on the set values of the command torques Tm1*, Tm2* may be together regarded as one example of "controlling means". The first electric motor MG1 may be regarded as one example of the "power generator". The drive-force distribution mechanism 30 may be regarded as one example of the "three-shaft drive-force input-output mechanism". The double-rotor electric motor 230 may also be regarded as one example of the "electric-power drive-force input-output means".

The "internal combustion engine" is not limited to internal combustion engines that produce drive force using hydrocarbon fuel such as gasoline and light oil. That is, it includes internal combustion engines of various other types, such as hydrogen engines. The "electric-power drive-force input-output means" is not limited to the combination of the drive-force distribution mechanism 30 and the first electric motor MG1 nor to the double-rotor electric motor 230, but it may be any other structure that is connected to a drive shaft coupled with a drive axle and to the output shaft of the internal combustion engine and inputs drive force to and receives drive force from the drive shaft and the output shaft of the internal combustion engine while inputting and outputting electric power and drive force. The "electric motor" is not limited to the second electric motor MG2 that is a synchronous motor-generator, but it may be any other electric motor (e.g., an induction motor) as long as said motor can input drive force to and receive drive force from the drive shaft. The "power storage device" is not limited to the battery 50 that is a secondary battery, but it may be any other power storage device, such as a capacitor, as long as it can power and be powered by the electric-power drive-force input-output means and the electric power. The "atmospheric-pressure detecting means" is not limited to the atmospheric pressure sensor 89 that detects the atmospheric pressure Pa, but it may be any other means for detecting the atmospheric pressure. The "maximum-dischargeable-electric-power setting means" is not limited to setting means that sets the basic maximum dischargeable electric power Woutb, which is the basic value of the maximum electric power allowed to be discharged from the battery 50, based on the battery temperature Tb, and then if the atmospheric pressure Pa is equal to or higher than the threshold pressure Paref, sets the correction coefficient α using the normal-state correction coefficient setting map, and if the atmospheric pressure Pa is lower than the threshold pressure Paref, sets the correction coefficient α using the low-pressure-state correction coefficient setting map that is formulated such that the correction coefficient α is made smaller than when the atmospheric pressure Pa is equal to or higher than Paref, and then sets the maximum dischargeable electric power Wout of the battery 50 by multiplying the basic maximum dischargeable electric power Woutb by the correction coefficient α thus set. That is, the "maximum-dischargeable-electric-power setting means" may be any setting means that sets a maximum dischargeable electric power representing a maximum electric power allowed to be discharged from the power storage device, sets the maximum dischargeable electric power based on a first relation between the maximum dischargeable electric power and a state of the power storage device when the atmospheric pressure detected by the atmospheric-pressure detecting means is equal to or higher than a predetermined atmospheric pressure, and sets the maximum dischargeable electric power based on a second relation between the maximum dischargeable electric power and the state of the power storage device when the atmospheric pressure detected by the atmospheric-pressure detecting means is lower than a predetermined atmospheric pressure. The "controlling means" is not limited to the combination of the hybrid ECU 70, the engine ECU 24, and the motor ECU 40. For example, it may be provided as a single electronic control unit. Further, the "controlling means" is not limited to controlling means that sets the target engine speed Ne* and the target engine torque Te* of the engine 22, the command torque Tm1* of the first electric motor MG1, and the command torque Tm2* of the second electric motor MG2 such that the required vehicle torque Tr* is output to the ring gear shaft 32a, which serves as the drive shaft, without discharging electric power from the battery 50 beyond the maximum dischargeable electric power Wout, and controls the engine 22, the first electric motor MG1, and the second electric motor MG2 based on the set values of the target engine speed Ne*, the target engine torque Te*, and the command torques Tm1*, Tm2*. For example, the "controlling means" may be any controlling means for controlling the internal combustion engine, the electric-power drive-force input-output means, the electric motor so as to produce required drive force for propelling the hybrid vehicle without discharging electric power from the power storage device beyond the maximum dischargeable electric power of the power storage device. The "power generator" is not limited to the first electric motor MG1 that is a synchronous motor-generator, but it may be any other power generator (e.g., an induction motor) as long as said generator can input and output drive force as needed. The "three-shaft drive-force input-output mechanism" is not limited to the drive-force distribution mechanism 30, but it may be any other drive-force input-output mechanism that is connected to the drive shaft, the output shaft of the internal combustion engine, and a rotational shaft of the power generator and inputs drive force to or outputs drive force from one of the three shafts based on drive forces input to or output from the other two shafts, and it includes, for example, a drive-force input-output mechanism constituted of a plurality of differential gearsets and connected to four or more shafts, a differential unit that provides effects different from those obtained with a planetary gear unit, and so on.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention is applicable to auto-motive manufacturing, for example.

The invention claimed is:

1. A method for controlling a hybrid vehicle having: an internal combustion engine; an electric-power drive-force inputting-outputting device which is connected to a drive shaft coupled with a drive axle and is connected to an output shaft of the internal combustion engine such that the output shaft of the internal combustion engine is rotatable relative to the drive shaft and which inputs drive force to and receives drive force from the drive shaft and the output shaft of the internal combustion engine while inputting and outputting electric power and drive force; an electric motor that outputs drive force to the drive-shaft; and a power storage device that powers and is powered by the electric-power drive-force inputting-outputting device and the electric motor, comprising:

detecting atmospheric pressure;

setting a first maximum dischargeable electric power of the power storage device based on a first relation between the first maximum dischargeable electric power and a state of the power storage device, when the detected atmospheric pressure is equal to or higher than a predetermined atmospheric pressure;

and controlling the internal combustion engine, the electric-power drive-force inputting-outputting device, and the electric motor such that a required drive force is produced to propel the hybrid vehicle without discharging electric power from the power storage device beyond the first maximum dischargeable electric power;

setting a second maximum dischargeable electric power based on a second relation between the second maximum dischargeable electric power and the state of the power storage device that is formulated such that the second maximum dischargeable electric power of the power storage device is set smaller than it is by the first relation, when the detected atmospheric pressure is lower than the predetermined atmospheric pressure; and controlling the internal combustion engine, the electric-power drive-force inputting-outputting device, and the electric motor such that the required drive force is produced to propel the hybrid vehicle without discharging electric power from the power storage device beyond the second maximum dischargeable electric power, setting the first relation such that, when the charge level of the power storage device is within a given range that ranges from a first reference charge level as a lower limit, the lower the charge level of the power storage device, the smaller the first maximum dischargeable electric power of the power storage device is made, and setting the second relation such that, when the charge level of the power storage device is within a given range that ranges from, as a lower limit, a second reference charge level that is higher than the first reference charge level, the lower the charge level (SOC) of the power storage device, the smaller the second maximum dischargeable electric power of the power storage device is made.

2. A method for controlling a hybrid vehicle according to claim 1 wherein:

further setting the first relation such that, when the charge level of the power storage device is lower than a third reference charge level, the lower the charge level of the power storage device, the smaller the first maximum dischargeable electric power of the power storage device is made, and further setting the second relation such that, when the charge level of the power storage device is lower than a fourth reference charge level that is higher than the third reference charge level, the lower the charge level of the power storage device, the smaller the second maximum dischargeable electric power of the power storage device is made.

3. A hybrid vehicle comprising:

an internal combustion engine;

an electric-power drive-force inputting-outputting device which is connected to a drive shaft coupled with a drive axle and is connected to an output shaft of the internal combustion engine such that the output shaft of the internal combustion engine is rotatable relative to the drive shaft and which inputs drive force to and receives drive force from the drive shaft and the output shaft of the internal combustion engine while inputting and outputting electric power and drive force;

an electric motor that outputs drive force to the drive shaft;

a power storage device that powers and is powered by the electric-power drive-force inputting-outputting device and the electric motor;

an atmospheric-pressure detector that detects atmospheric pressure;

a maximum-dischargeable-electric-power setting device that sets a maximum dischargeable electric power of the power storage device, wherein the maximum-dischargeable-electric-power setting device sets the maximum dischargeable electric power of the power storage device based on a first relation between the maximum dischargeable electric power and a state of the power storage device when the atmospheric pressure detected by the atmospheric-pressure detector is equal to or higher than a predetermined atmospheric pressure and the maximum-dischargeable-electric-power setting device sets the maximum dischargeable electric power based on a second relation between the maximum dischargeable electric power and the state of the power storage device when the atmospheric pressure detected by the atmospheric-pressure detector is lower than the predetermined atmospheric pressure, the second relation being formulated such that the maximum dischargeable electric power of the power storage device is set smaller than it is by the first relation; and a controller that controls the internal combustion engine, the electric-power drive-force inputting-outputting device, and the electric motor such that a required drive force is produced to propel the hybrid vehicle without discharging electric power from the power storage device beyond the maximum dischargeable electric power the first relation is such that, when the charge level of the power storage device is within a given range that ranges from a first reference charge level as a lower limit, the lower the charge level of the power storage device, the smaller the maximum dischargeable electric power of the power storage device is made, and the second relation is such that, when the charge level of the power storage device is within a given range that ranges from, as a lower limit, a second reference charge level that is higher than the first reference charge level, the lower the charge level of the power storage device, the smaller the maximum dischargeable electric power of the power storage device is made.

4. A hybrid vehicle according to claim 3, wherein:

the first relation is further such that, when the charge level of the power storage device is lower than a third reference charge level, the lower the charge level of the power storage device, the smaller the maximum dischargeable electric power of the power storage device is made, and the second relation is further such that, when the charge level of the power storage device is lower than a fourth reference charge level that is higher than the third reference charge level, the lower the charge level of the power storage device, the smaller the maximum dischargeable electric power of the power storage device is made.

5. The hybrid vehicle according to claim 3, wherein the second relation is such that the lower the atmospheric pressure detected by the atmospheric-pressure detector, the smaller the maximum dischargeable electric power of the power storage device is made.

6. The hybrid vehicle according to claim 3, wherein the electric-power drive-force inputting-outputting device has a power generator that inputs and outputs drive forces and a three-shaft drive-force input-output mechanism that is connected to the drive shaft, the output shaft of the internal combustion engine, and a rotational shaft of the power generator and inputs drive force to or outputs drive force from one of the three shafts based on drive forces input to and output from the other two shafts.

* * * * *